(12) United States Patent
Xiong et al.

(10) Patent No.: US 11,407,873 B2
(45) Date of Patent: Aug. 9, 2022

(54) PROCESS FOR FOAMING POLYOLEFIN COMPOSITIONS USING A MODIFIED HIGH DENSITY POLYETHYLENE

(71) Applicant: Dow Global Technologeis LLC, Midland, MI (US)

(72) Inventors: Jiawen Xiong, Shanghai (CN); Gangwei Sun, Shanghai (CN); Mohamed Esseghir, Collegeville, PA (US); Hongyu Chen, Shanghai (CN); Jeffrey M. Cogen, Collegeville, PA (US); Yi Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 471 days.

(21) Appl. No.: 16/475,933

(22) PCT Filed: Feb. 7, 2017

(86) PCT No.: PCT/CN2017/073036
§ 371 (c)(1),
(2) Date: Jul. 3, 2019

(87) PCT Pub. No.: WO2018/145243
PCT Pub. Date: Aug. 16, 2018

(65) Prior Publication Data
US 2019/0352482 A1 Nov. 21, 2019

(51) Int. Cl.
| | | |
|---|---|---|
| *C08J 9/00* | (2006.01) | |
| *C08J 9/12* | (2006.01) | |
| *C08K 5/00* | (2006.01) | |

(52) U.S. Cl.
CPC ............ *C08J 9/0061* (2013.01); *C08J 9/122* (2013.01); *C08K 5/0083* (2013.01); *C08J 2201/03* (2013.01); *C08J 2207/06* (2013.01); *C08J 2323/06* (2013.01); *C08J 2323/30* (2013.01); *C08J 2427/18* (2013.01)

(58) Field of Classification Search
CPC ...... C08J 9/0061; C08J 9/122; C08J 2201/03; C08J 2207/06; C08J 2323/06; C08J 2323/30; C08J 2427/18; C08J 2423/04; C08J 9/12; C08J 2423/26; C08J 9/04; C08K 5/0083; C08L 23/0815; C08L 2203/14; C08L 2205/24; C08L 2207/062; C08L 2207/066; C08L 2310/00; C08L 23/06; C08L 23/30; H01B 3/441; H01B 7/2855

See application file for complete search history.

(56) References Cited

U.S. PATENT DOCUMENTS

| | | | |
|---|---|---|---|
| 6,281,264 B1 * | 8/2001 | Salovey | ............... A61F 2/30 523/115 |
| 8,476,527 B2 | 7/2013 | Abe et al. | |
| 8,715,798 B2 | 5/2014 | Suzuki et al. | |
| 9,978,478 B2 | 5/2018 | Andersson et al. | |
| 2008/0242754 A1 * | 10/2008 | Champagne | ............. C08J 9/103 521/94 |
| 2012/0273474 A1 | 11/2012 | Joo | |
| 2014/0093732 A1 | 4/2014 | Andersson et al. | |
| 2017/0327676 A1 | 11/2017 | Sun et al. | |

FOREIGN PATENT DOCUMENTS

| | | |
|---|---|---|
| CN | 104893109 A | 9/2015 |
| CN | 106356136 A | 1/2017 |
| JP | S581531 A | 1/1983 |
| JP | H0598089 A | 4/1993 |
| JP | 2000226463 A | 8/2000 |
| KR | 0140723 B1 | 7/1998 |
| WO | 2014064801 A1 | 5/2014 |
| WO | 2016082211 A1 | 6/2016 |

OTHER PUBLICATIONS

International Search Report and Written Opinion for International Application No. PCT/CN2017/073036 dated Nov. 16, 2017, 7 pages.

* cited by examiner

*Primary Examiner* — Irina S Zemel
(74) *Attorney, Agent, or Firm* — Quarles & Brady LLP

(57) ABSTRACT

The present disclosure provides a foamable composition containing (A) a high density polyethylene (HDPE); (B) a low density polyethylene (LDPE); (C) a peroxide-modified HDPE; and (D) a nucleator. The present disclosure also provides a process for making a foam composition. Additionally, the present disclosure provides a foam formed from a foamable composition, and a cable with an insulation layer containing the foam.

14 Claims, 2 Drawing Sheets

PROCESS FOR FOAMING POLYOLEFIN COMPOSITIONS USING A MODIFIED HIGH DENSITY POLYETHYLENE

BACKGROUND

The present disclosure relates to polyethylene foams. In one aspect, the present disclosure relates to polyethylene foams useful as telecom insulation while in another aspect, the present disclosure relates to coaxial and radio frequency cables comprising polyethylene foams.

Coaxial/radio frequency cables made of highly foamed polyethylene are widely used as antenna feeders, cabling of antenna arrays, equipment interconnections, mobile telecommunication systems, microwave transmission systems, broadcast transmission systems and other communication systems. Rapid development of mobile telecommunication systems has increased consumer demand for high quality radio frequency cables with minimum signal attenuation and broader bandwidth in the high frequency range (e.g., >2.47 GHz, or >5 GHz, or >20 GHz). As demand for high bandwidth increases, cables require the use of a highly foamed dielectric made with polymer resins, e.g., a polyolefin, with minimum polar groups or polar additives and which are cost effective and have good electrical properties.

Usually, a high frequency cable is made of an inner conductor surrounded by a foamed insulation. The base resin for insulation is generally a mixture of high density polyethylene (HDPE), high pressure low density polyethylene (HPLDPE, or simply, LDPE), and a nucleating master batch. In general, the ratio of HDPE to LDPE is 70-80% HDPE/30-20% LDPE. The nucleating master batch is typically added at about 1-3% and is generally also based on a LDPE resin. Due to less branching in the molecular structure of HDPE, the dissipation factor (Df) of HDPE is lower than LDPE and as such, the majority of base resin for cable insulation is typically HDPE. Moreover, this provides desirable mechanical properties to the foam such as high crush resistance. LDPE, in contrast, enhances the overall melt strength of the base resin due to its branched structure. However, a need exists for a foamed composition with (i) a higher expansion ratio, (ii) a finer cell size, and/or (iii) a more uniformly distributed cell structure than conventional foamed HDPE/LDPE insulation.

A need also exists for an insulation with a thin wall (e.g., <0.4 mm) with improved crush resistance to withstand the cabling process, including twisting and shielding.

A need also exists for an insulation that can be foamed with a physical foaming agent on typical extrusion foaming equipment.

SUMMARY OF THE INVENTION

In one embodiment, the present disclosure provides a foamable composition comprising (A) a high density polyethylene (HDPE); (B) a low density polyethylene (LDPE); (C) a peroxide-modified HDPE; (D) a nucleator; (E) optionally, an additive; and (F) optionally, a foaming agent.

In one embodiment, the present disclosure provides a process for making a foam composition, the process comprising the steps of:
(i) forming a composition comprising:
(A) a high density polyethylene (HDPE);
(B) a low density polyethylene (LDPE);
(C) a peroxide-modified HDPE,
(D) a nucleator; and
(E) optional additive; and (ii) contacting the composition with a foaming agent at a pressure from 1 MPa to 40 MPa under typical extrusion conditions.

In one embodiment, the present disclosure provides a foam formed from the foamable composition. In another embodiment, the present disclosure provides a cable comprising an insulation layer comprising the foam.

DETAILED DESCRIPTION

Definitions

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 to 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Unless stated to the contrary, implicit from the context, or customary in the art, all parts and percents are based on weight and all test methods are current as of the filing date of this disclosure.

"Agglomerate" and like terms refer a collection of two or more particles grouped together to constitute a whole. Agglomerates can be of various sizes. An agglomerate will always be larger than the particles from which it is made, but some particles not associated with a particular agglomerate can be larger than the agglomerate. In the practice of the present disclosure, agglomerates are typically less than one micron is size, or less than 0.5 micron, or less than 0.3 micron, in size.

"Blend" or "polyolefin blend" refer to an intimate physical mixture (that is, without reaction) of two or more polyolefins. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polyolefins on the macro level (for example, melt blending resins or compounding) or the micro level (for example, simultaneous forming within the same reactor).

A "cable" is at least one conductor, e.g., wire, optical fiber, etc., within a protective jacket or sheath. Typically, a cable is two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496, 629; and 6,714,707. A nonlimiting example of a cable is a radio frequency (RF) cable (e.g., a coaxial cable).

The term "composition" refers to a mixture of materials which comprise the composition, as well as reaction products and decomposition products formed from the materials of the composition.

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

An "ethylene-based polymer," "ethylene polymer," or "polyethylene" is a polymer that contains equal to or greater than 50 wt %, or a majority amount of, polymerized ethylene monomer (based on the total weight of the polymer) and, optionally, may contain at least one comonomer. The generic term "polyethylene" thus includes polyethylene homopolymer and polyethylene interpolymer. Nonlimiting examples of ethylene-based polymers include low density polyethylene (LDPE), linear low density polyethylene (LLDPE), very low density polyethylene (VLDPE), ultra low density polyethylene (ULDPE), medium density polyethylene (MDPE), and high density polyethylene (HDPE).

An "ethylene/α-olefin polymer" is a polymer that contains equal to or greater than 50 wt %, or a majority amount of, polymerized ethylene, based on the weight of the polymer, and one or more α-olefin comonomers.

A "masterbatch" is a concentrated mixture of additives in a carrier resin. In the context of the present disclosure, a masterbatch comprises a concentrated mixture of a nucleator in a polyolefin resin. The masterbatch allows for an efficient addition and dispersion of the nucleator to and in the polyolefin. The manufacture and use of masterbatches are well known to those skilled in the art of manufacturing and fabricating plastics and foam articles.

A "nucleator" or "nucleating agent" is a substance, typically a small particle, that provides a nucleation site or location for bubble formation within a polymer melt. Nucleating agents are used to enhance the cell structure of the foamed polymers.

"Olefin polymer," "olefinic polymer," "olefinic interpolymer," "polyolefin" and like terms refer to a polymer derived from simple olefins. A "polyolefin" contains equal to or greater than 50 wt %, or a majority amount of, polymerized olefin monomer (based on the total weight of the polymer), and optionally, may contain at least one comonomer. Nonlimiting examples of α-olefin monomer include $C_2$, or $C_3$ to $C_4$, or $C_6$, or $C_8$, or $C_{10}$, or $C_{12}$, or $C_{16}$, or $C_{18}$, or $C_{20}$ α-olefins, such as ethylene, propylene, 1-butene, 1-hexene, 4-methyl-1-pentene, and 1-octene. Representative polyolefins include polyethylene, polypropylene, polybutene, polyisoprene, and their various interpolymers.

A "particle" is a unitary mass. Particles can be of various sizes. A fluororesin particle, e.g., a PTFE particle, is a unitary mass of fluororesin. Two or more fluororesin particles grouped together, i.e., in contact with one another, form a fluororesin agglomerate. The fluororesin particles of the present disclosure are typically less than 1 micron is size, or less than 0.5 micron, or less than 0.3 micron, in size.

A "polymer" is a compound prepared by polymerizing monomers, whether of the same or a different type, that in polymerized form provide the multiple and/or repeating "units" or "mer units" that make up a polymer. "Polymer" includes homopolymers, copolymers, terpolymers, interpolymers, and so on. "Polymer" also embraces all forms of copolymer, e.g., random, block, etc. The term "homopolymer" refers to polymers prepared from only one type of monomer. An "interpolymer" is a polymer prepared by the polymerization of at least two types of monomers or comonomers. "Interpolymer" includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like. The term "ethylene/α-olefin polymer" is indicative of copolymer as described above prepared from polymerizing ethylene and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "polyolefin composition" is a composition comprising at least one polyolefin. A polyolefin composition includes polyolefin blends.

A "sheath" is a generic term and when used in relation to cables, it includes insulation coverings or layers, protective jackets and the like.

A "wire" is a single strand of conductive metal, e.g., copper or aluminum, or a single strand of optical fiber.

An "unagglomerated particle" is a particle not associated with another particle of like kind. Unagglomerated particles include both particles that have dissociated from an agglomerate, and particles that have not been associated with an agglomerate.

The present disclosure provides a composition, and further a polyolefin composition. In an embodiment, the composition is a foamable composition. The composition includes:
 (A) a high density polyethylene (HDPE);
 (B) a low density polyethylene (LDPE);
 (C) a peroxide-modified HDPE;
 (D) a nucleator;
 (E) optionally, an additive; and
 (F) optionally, a foaming agent.

A. High Density Polyethylene (HDPE)

The present composition includes a high density polyethylene. A "high density polyethylene" (or "HDPE") is an ethylene-based polymer having a density of at least (>) 0.940 g/cc, or from at least (>) 0.940 g/cc to 0.980 g/cc. The HDPE has a melt index (190° C./2.16 kg) from 0.1 g/10 min to 25 g/10 min. The HDPE excludes peroxide-modified HDPE. In other words, the HDPE and the peroxide-modified HDPE are two separate components that are distinct from one another.

The HDPE can include ethylene and, optionally, one or more $C_3$-$C_{20}$, or $C_4$-$C_{20}$ α-olefin comonomers. The comonomer(s) can be linear or branched. Nonlimiting examples of suitable comonomers include propylene, 1-butene, 1-pentene, 4-methyl-1-pentene, 1-hexene, and 1-octene. The HDPE can be prepared with either Ziegler-Natta, chromium-based, constrained geometry or metallocene catalysts in slurry reactors, gas phase reactors or solution reactors. The ethylene/$C_3$-$C_{20}$ α-olefin copolymer includes at least 50 percent by weight ethylene polymerized therein, or at least 70 percent by weight, or at least 80 percent by weight, or at least 85 percent by weight, or at least 90 weight percent, or at least 95 percent by weight ethylene in polymerized form, based on the total weight of the ethylene/$C_3$-$C_{20}$ α-olefin copolymer. The remainder of the ethylene/$C_3$-$C_{20}$ α-olefin copolymer is derived from units of $C_3$-$C_{20}$ α-olefin copolymer.

Nonlimiting examples of suitable HDPE include ELITE 5960G, HDPE KT 10000 UE, HDPE KS 10100 UE, HDPE 35057E, and HDPE DGDA-6944 NT, each available from The Dow Chemical Company Midland, Mich., USA; and SURPASS® available from Nova Chemicals Corporation, Calgary, Alberta, Canada.

In an embodiment, the HDPE is an ethylene/α-olefin copolymer with a density from 0.950 g/cc to 0.980 g/cc, and a melt index (190° C./2.16 kg) from 0.1 g/10 min to 10 g/10 min. In an embodiment, the HDPE has a density from 0.960 g/cc to 0.980 g/cc, and a melt index (190° C./2.16 kg) from 0.1 g/10 min to 10 g/10 min.

In an embodiment, the HDPE is an ethylene homopolymer with a density from at least (>) 0.940 g/cc to 0.980 g/cc, and a melt index (190° C./2.16 kg) from 0.1 g/10 min to 25 g/10 min.

HDPE suitable for use herein can have one, some, or all of the following properties:

(a) a density from 0.940 g/cc, or 0.945 g/cc, or 0.950 g/cc, or 0.955 g/cc, or 0.960 g/cc to 0.965 g/cc, or 0.970 g/cc, or 0.975 g/cc, or 0.980 g/cc;

(b) a melt index (190° C./2.16 kg) from 0.1 g/10 min, or 1.0 g/10 min, or 2.0 g/10 min, or 5.0 g/10 min, or 6.0 g/10 min to 8.0 g/10 min, or 10.0 g/10 min, or 15.0 g/10 min, or 18.0 g/10 min, or 20 g/10 min, or 25 g/10 min; and/or (c) an ethylene content of from 50 wt %, or greater than 50 wt %, or 51 wt %, or 55 wt %, or 60 wt %, or 65 wt %, or 70 wt %, or 75 wt % to 80 wt %, or 85 wt %, or 90 wt %, or 95 wt %, or 98 wt %, or less than 100 wt %, or 100 wt % polymerized ethylene monomer (based on the total weight of the HDPE).

In various embodiments, the HDPE has at least two, or all of properties (a)-(c).

In an embodiment, the HDPE has a density from 0.940 g/cc to 0.980 g/cc, or from 0.950 g/cc to 0.980 g/cc, or from 0.965 g/cc to 0.975 g/cc and a melt index (190° C./2.16 kg) from 0.01 g/10 min to 25 g/10 min, or from 1 g/10 min to 20 g/10 min, or from 5 g/10 min to 15 g/10 min.

In an embodiment, the composition includes from 50 wt %, or 55 wt %, or 60 wt % to 69 wt %, or 70 wt %, or 75 wt %, or 80 wt %, or 85 wt %, or 90 wt %, or 95 wt % HDPE, based on the total weight of the composition. In another embodiment, the composition includes from 50 wt % to 95 wt %, or from 55 wt % to 90 wt %, or from 60 wt % to 85 wt %, or from 60 wt % to 80 wt % HDPE, based on the total weight of the composition.

The HDPE may comprise one or more embodiments disclosed herein.

B. Low Density Polyethylene (LDPE)

The present composition includes a low density polyethylene. A "low density polyethylene" (or "LDPE") is an ethylene-based polymer having a density of from 0.910 g/cc to 0.925 g/cc, or 0.935 g/cc, or less than 0.940 g/cc.

A nonlimiting example of a suitable LDPE is a high pressure LDPE. A "high pressure LDPE" is a low density ethylene homopolymer with a density from 0.910 g/cc to less than 0.940 g/cc produced by way of free radical polymerization under high pressure. The high pressure LDPE may be produced via free radical polymerization. A nonlimiting example of a suitable high pressure LDPE is disclosed in International Publication No. WO 2012/177299, incorporated herein in its entirety.

The LDPE can include ethylene; optionally, one or more $C_3$-$C_{20}$, or $C_3$-$C_{10}$, or $C_4$-$C_{20}$, or $C_3$-$C_4$ α-olefin comonomers; and optionally one or more of ethyl acrylate, vinyl acetate, and vinyl silane comonomers. The LDPE copolymer includes at least 50 percent by weight ethylene polymerized therein, or at least 70 percent by weight, or at least 80 percent by weight, or at least 85 percent by weight, or at least 90 weight percent, or at least 95 percent by weight ethylene in polymerized form, based on the total weight of the LDPE copolymer. The remainder of the LDPE copolymer is derived from units of $C_3$-$C_{20}$ α-olefin, ethyl acrylate, vinyl acetate, and/or vinyl silane comonomer.

Nonlimiting examples of suitable LDPE include DOW Low Density Polyethylene resins such as LDPE DFDB-1258 NT, available from The Dow Chemical Company and, in general, any fractional melt flow index (MFI) resin for use in heavy duty bags or agricultural films such as those available from Borealis, Basel, Sabic and others.

In an embodiment, the LDPE, such as a high pressure LDPE, has a density from 0.915 g/cc to 0.925 g/cc, and a melt index (190° C./2.16 kg) from 0.15 g/10 min to 50 g/10 min. In an embodiment, the LDPE has a density from 0.920 g/cc to 0.925 g/cc, and a melt index (190° C./2.16 kg) from 0.15 g/10 min to 10 g/10 min.

In an embodiment, the LDPE is an ethylene homopolymer with a density from 0.915 g/cc to 0.925 g/cc, and a melt index (190° C./2.16 kg) from 0.15 g/10 min to 50 g/10 min.

LDPE suitable for use herein can have one, some, or all of the following properties:

(a) a density from 0.915 g/cc, or 0.918 g/cc, or 0.920 g/cc to 0.922 g/cc, or 0.925 g/cc; and/or (b) a melt index (190° C./2.16 kg) from 0.15 g/10 min, or 1.0 g/10 min to 2 g/10 min, or 10 g/10 min, or 20 g/10 min, or 30 g/10 min, or 40 g/10 min, or 50 g/10 min; and/or (c) an ethylene content of from 50 wt %, or greater than 50 wt %, or 51 wt %, or 55 wt %, or 60 wt %, or 65 wt %, or 70 wt %, or 75 wt % to 80 wt %, or 85 wt %, or 90 wt %, or 95 wt %, or 98 wt %, or less than 100 wt %, or 100 wt % polymerized ethylene monomer (based on the total weight of the LDPE).

In various embodiments, the LDPE has at least two, or all of properties (a)-(c).

In an embodiment, the LDPE has a density from 0.915 g/cc to 0.925 g/cc, or from 0.918 g/cc to 0.922 g/cc and a melt index (190° C./2.16 kg) from 0.15 g/10 min to 50 g/10 min, or from 1.0 g/10 min to 20 g/10 min.

In an embodiment, the composition includes from 5 wt %, or 10 wt %, or 15 wt %, or 20 wt %, or 25 wt %, or 28 wt % to 30 wt %, or 35 wt %, or 40 wt %, or 45 wt %, or 50 wt % LDPE, based on the total weight of the composition. In a further embodiment, the composition includes from 5 wt % to 50 wt %, or from 5 wt % to 30 wt %, or from 15 wt % to 30 wt % LDPE, based on the total weight of the composition.

The LDPE may comprise one or more embodiments disclosed herein.

In an embodiment, the HDPE and LDPE are combined to form an "HDPE/LDPE blend" before incorporation into the present composition. The HDPE/LDPE blend excludes the peroxide-modified HDPE and the nucleator. In an embodiment, the HDPE/LDPE blend contains from 45 wt %, or 50 wt %, or 55 wt %, or 60 wt %, or 65 wt %, or 70 wt % to 75 wt %, or 80 wt %, or 85 wt %, or 90 wt %, or 95 wt % HDPE, and a reciprocal amount, or from 5 wt %, or 10 wt %, or 15 wt %, or 20 wt %, or 25 wt % to 30 wt %, or 35 wt %, or 40 wt %, or 45 wt %, or 50 wt %, or 55 wt % LDPE, based on the total weight of the HDPE/LDPE blend. In an embodiment, the HDPE/LDPE blend consists of HDPE and LDPE. In another embodiment, a minor amount, e.g., from 0.1 wt %, or 1 wt % to 2 wt %, or 3 wt %, or 4 wt %, or 5 wt % of one or more other polymers, e.g., one or more other polyolefins such as polypropylene, may be present in the HDPE/LDPE blend.

The HDPE/LDPE blend may comprise one or more embodiments disclosed herein.

C. Peroxide-Modified HDPE

The present composition includes a peroxide-modified HDPE. A "peroxide-modified HDPE" is a HDPE that has been melt blended with a peroxide such that the peroxide acts as a rheology modifying agent in such a way that the HDPE rheology is altered, but not crosslinked in the common understanding to result in a thermoset resin. In other words, the peroxide-modified HDPE is still melt processable. A nonlimiting example of a suitable melt blending process is an extrusion process. The HDPE may be any HDPE previously disclosed herein.

A nonlimiting example of a suitable peroxide is a dialkyl peroxide. Nonlimiting examples of suitable dialkyl peroxides include dicumyl peroxide; di-t-butyl peroxide; t-butyl cumyl peroxide; 2,5-dimethyl-2,5-di(tert-butylperoxy)-hexane; 2,5-dimethyl-2,5-di(tert-amylperoxy)-hexane; 2,5-dimethyl-2,5-di(tert-butylperoxy)hexyne-3,2,5-dimethyl-2,5-di(tert-amylpero-xy)hexyne-3; α,α-di[(tert-butylperoxy)-isopropyl]-benzene; di-t-amyl peroxide (DTAP); 1,3,5-tri-[(tert-butylperoxy)-isopropyl]benzene; 1,3-dimethyl-3-(tert-butylperoxy)butanol; 1,3-dimethyl-3-(tert-amylperoxy) butanol; and mixtures of two or more of these peroxides. In an embodiment, the peroxide is selected from di-t-amyl peroxide (DTAP); 2,5-dimethyl-2,5-di(tert-butylperoxy)-hexane; dicumyl peroxide; and combinations thereof. In another embodiment, the peroxide is di-t-amyl peroxide (DTAP).

In an embodiment, the peroxide-modified HDPE is formed by melt blending, such as by extrusion, from 99 wt %, or 99.2 wt % to 99.5 wt %, or 99.9 wt % HDPE and from 0.05 wt %, or 0.1 wt %, or 0.5 wt % to 0.8 wt %, or 1.0 wt % peroxide, based on the combined amount of HDPE and peroxide. In an embodiment, all, or substantially all, of the peroxide reacts with the HDPE during melt blending such that the peroxide-modified HDPE contains 0 wt %, or from 0 wt % to less than 0.01 wt % peroxide.

In an embodiment, the composition includes from 2 wt %, or 3 wt %, or 4 wt % to 5 wt %, or 6 wt %, or 7 wt %, or 8 wt %, or 9 wt %, or 10 wt % peroxide-modified HDPE, based on the total weight of the composition. In another embodiment, the composition includes from 2 wt % to 10 wt % peroxide-modified HDPE, based on the total weight of the composition.

The peroxide-modified HDPE may comprise one or more embodiments disclosed herein.

D. Nucleator

The present composition includes a nucleator. Nonlimiting examples of suitable nucleator include fluororesins, boron nitride, alumina, silica, poly(4-methyl pentene), zirconia, talc, azodicarbonamide (ADCA), and 4,4'-oxybisbenzenesulfonylhydrazide (OBSH). In an embodiment, the nucleator is selected from a fluororesin, boron nitride, ADCA, silica, poly(4-methyl pentene), and combinations thereof.

The fluororesin may be various polymers inclusive of a homopolymer and a copolymer of fluorine-containing monomers. Nonlimiting examples of suitable fluororesin include polytetrafluoroethylene (PTFE), tetrafluoroethylene-perfluoroalkyl vinyl ether copolymer (PFA), ethylene tetrafluoroethylene copolymer (ETFE), tetrafluoroethylene-hexafluoropropylene copolymer (FEP), tetrafluoroethylene-ethylene copolymer, polyvinylidene fluoride (PVdF), polychlorotrifluoroethylene (PCTFE), chlorotrifluoroethylene-ethylene copolymer (ECTFE), and the like. In an embodiment, the nucleator is a fluororesin selected from PTFE, PFA, ETFE, and combinations thereof. In another embodiment, the nucleator is a fluororesin that is PTFE.

In one embodiment the fluororesin is prepared by dispersion polymerization (as opposed to suspension polymerization). Dispersion polymerization typically produces fluororesin particles of submicron size, e.g., 0.1-4.3 microns, and these particles tend to agglomerate, often into agglomerates of 5 microns or larger in size. One embodiment in the practice of the process comprises the step of reducing the size of such fluororesin agglomerates to agglomerates of submicron size and/or into the individual submicron particles that form the agglomerate, this size reduction performed prior to foaming the mixture of the fluororesin nucleator, HDPE, LDPE, and peroxide-modified HDPE. In one embodiment the fluororesin nucleator, HDPE, LDPE, and peroxide-modified HDPE are mixed, preferably batch mixed, after the fluororesin agglomerates have undergone size reduction.

While the shape of the fluororesin particles, typically in the bulk form of a powder, is not particularly limited, it is preferable that the particles are primarily sphere-like in shape to produce a foam comprising fine cells and superior uniform foaming.

Fluororesin particles, particularly those of less than a micron in size, tend to agglomerate. In one embodiment, the nucleator is at least one fluororesin (e.g., PTFE). Some commercially available fluororesin powders, particularly those made by dispersion polymerization, comprise a high concentration of agglomerates of at least 5 microns (μm) in size, e.g., diameter. Typically, the size of the agglomerates range from 4 to 50 microns, more typically from 5 to 20 microns and even more typically from 5 to 15 microns. Typically, the amount of nucleator particles of at least 5 μm in size in these powders is at least 80%, more typically at least 82%, and even more typically at least 85%. These powders do not disperse well in many polyolefins, e.g., HDPE and/or LDPE.

While agglomerated fluororesin particles, i.e., agglomerates, can be used in the practice of this disclosure (subject to the size distribution of less than one micron, preferably less than 0.5 micron and more preferably less than 0.3 micron), the use of unagglomerated particles are preferred. Accordingly, the fluororesin nucleators are typically unagglomerated particles which may be commingled with agglomerates that were either originally submicron in size or were reduced in size from greater than a micron to less than a micron The practice of the disclosure can tolerate the presence of some (e.g., less than 10%, or 9%, or 8%, or 7%, or 6%, or 5%, or 4%, or 3%, or 2%, or 1% of the total particles and/or agglomerates mixed with the polyolefin) particles and/or agglomerates that are greater than a micron in size, but the smaller the amount of such particles and/or agglomerates, the better the dispersion of the particles and agglomerates in the HDPE, LDPE, and peroxide-modified HDPE, and the more evenly distributed are the cell sizes in the foamed product.

Agglomerated particles can be separated from one another by any conventional means, e.g., grinding, mixing or stirring (typically at a relatively high speed), etc. In one embodiment, the fluororesin nucleator comprising agglomerates of one micron or greater, typically of 3, or 4, or 5 microns or greater, is subjected to any procedure, treatment, etc. that will reduce the majority, preferably 80%, 82%, 85%, 90% or more, of the such agglomerates to either unagglomerated particles of less than a micron in size, or agglomerates of less than a micron in size before the nucleator is mixed with the HDPE, LDPE, peroxide-modified HDPE, or combinations thereof.

In one embodiment, the fluororesin nucleator comprising agglomerates of one micron or greater, typically of 3, or 4, or 5 microns or greater, is first mixed with a polyolefin to form a masterbatch, and then the masterbatch is subjected to any procedure, treatment, etc. that will reduce the majority, preferably 80%, 82%, 85%, 90% or more, of the such agglomerates to either unagglomerated particles of less than a micron in size, or agglomerates of less than a micron in size. Typically, the masterbatch comprises from 1 wt % to 50 wt %, more typically from 5 wt % to 50 wt % and even more typically from 10 wt % to 20 wt % nucleator, and from 50 wt % to 99 wt %, more typically from 70 wt % to 95 wt % and even more typically from 80 wt % to 90 wt % polyolefin. After the masterbatch is subjected to the nucleator size reduction procedure, treatment, etc., the masterbatch is mixed with the HDPE, LDPE, and peroxide-modified HDPE to be foamed under conditions and for a sufficient period of time to uniformly disperse the unagglomerated particles and agglomerates within the HDPE, LDPE, and peroxide-modified HDPE before the start of the foaming process. A nonlimiting example of a suitable masterbatch containing a nucleator is a masterbatch containing a fluororesin nucleator (e.g., PTFE) and an ethene homopolymer.

In one embodiment the fluororesin nucleator comprising agglomerates of one micron or greater, typically of 3, or 4, or 5 microns or greater, is first mixed with the HDPE, LDPE, peroxide-modified HDPE, or combinations thereof, in the amount desired for the practice of the foaming process, and then the mixture is subjected to any procedure, treatment, etc. for a sufficient amount of time that will both (1) reduce the majority, preferably 80%, 82%, 85%, 90% or more, of the such agglomerates to either unagglomerated particles of less than a micron in size, or agglomerates of less than a micron in size, and (2) substantially uniformly disperse these unagglomerated particles and reduced agglomerates within the HDPE, LDPE, and/or peroxide-modified HDPE before the foaming process commences.

The nucleator, particularly PTFE of the particle size distribution described above, can be added to the HDPE, LDPE, peroxide-modified HDPE, or combinations thereof, by any conventional means. The nucleator can be added neat, in combination with one or more other additives, e.g., antioxidant, cell stabilizer, etc., or as part of a masterbatch. The nucleator is mixed with the HDPE, LDPE, and/or peroxide-modified HDPE to achieve an essentially homogeneous dispersion of nucleator in the HDPE, LDPE, and/or peroxide-modified HDPE and to this end, batch mixing, e.g., through the use of a BUSS™ kneader, is typically preferred to mixing in an extruder. If the nucleator is first mixed with the HDPE, LDPE, and/or peroxide-modified HDPE in an extruder, then it is typically added to the HDPE, LDPE, and/or peroxide-modified HDPE prior to injection of the foaming agent for foaming.

In an embodiment, the nucleator is homogeneously compounded with the LDPE to produce a nucleated LDPE, and the nucleated LDPE is fed into a foaming extruder along with the HDPE and the peroxide-modified HDPE.

In an embodiment, the nucleator is homogeneously compounded with the HDPE to produce a nucleated HDPE, and the nucleated HDPE is fed into a foaming extruder along with the LDPE and the peroxide-modified HDPE.

In an embodiment, the nucleator is homogeneously compounded with the peroxide-modified HDPE to produce a nucleated peroxide-modified HDPE, and the nucleated peroxide-modified HDPE is fed into a foaming extruder along with the LDPE and the HDPE.

In an embodiment, the nucleator is fed into a foaming extruder with the LDPE, the HDPE, and the peroxide-modified HDPE. In another embodiment, the nucleator, the LDPE, the HDPE, and the peroxide-modified HDPE are simultaneously fed into a foaming extruder. The nucleator may or may not be part of a masterbatch.

Particle size can be determined by any method known in the art. In one embodiment, the determination of particle size and proportion (% by number) of fluororesin powder can be determined as follows. A dispersion comprising a fluororesin powder obtained by a dispersing treatment for about 2 minutes under ultrasonication of about 3540 kHz and ethanol, wherein the fluororesin powder is contained in an amount to make a laser permeation (proportion of output light to incident light) of the dispersion 70-95%, is subjected to a microtrack particle size analyzer under relative refraction (determination is done based on the ratio of diffraction ratio (about 0.99) of fluororesin powder to that of ethanol or according to the measure of the above-mentioned particle size analyzer which is the nearest to the ratio (e.g., 1.02)) and flow type cell measurement mode to determine particle size ($D_1, D_2, D_3 \ldots$) of individual particles and the number ($N_1, N_2, N_3 \ldots$) of particles having each particle size based on the optical diffraction of the laser. In this case, the particle size (D) of individual particles is automatically measured by the microtrack particle size analyzer wherein particles having various shapes are measured in terms of the diameters of the corresponding spheres. Therefore, the proportion (% by number) of the particle size $D_1$ is expressed by the percentage of the number of these particles ($N_1$) to the number of the entire particles ($\Sigma N$). The proportion of the particles having a particle size of 0.1-0.5 µm is expressed by the percentage of the number of the particles having a particle size of 0.14-0.5 µm to the total number of the existing particles ($\Sigma N$). Similarly, the proportion of the particles having a particle size of not less than 5 µm is expressed by the percentage of the number of the particles having a particle size of not less than 5 µm to the total number of the existing particles ($\Sigma N$). On the other hand, the average particle size of the nucleator of the present invention can be calculated using the total number of existing particles ($\Sigma N$) and the total of the product of the cube of the particle size of respective particles and the total number of existing particles ($\Sigma ND^3$), according to the following formula Average Particle Size(μm)=$(\Sigma ND^3/\Sigma N)^{1/3}$.

Calculation of particle size is further illustrated in U.S. Pat. No. 6,121,335.

In an embodiment, the composition includes from 0.1 wt %, or 0.15 wt %, or 1.0 wt % to 1.5 wt %, or 2.0 wt %, or 3.0 wt %, or 4.0 wt %, or 5 wt % nucleator, based on the total weight of the composition. In another embodiment, the composition includes from 0.1 wt %, or 1.5 wt % to 5 wt %, or from 1.0 wt % to 3.0 wt % nucleator, based on the total weight of the composition.

In an embodiment, the composition includes from 0.1 wt %, or 0.15 wt %, or 1.0 wt % to 1.5 wt %, or 2.0 wt %, or 3.0 wt %, or 4.0 wt %, or 5 wt % nucleator masterbatch, based on the total weight of the composition. In another embodiment, the composition includes from 0.1 wt %, or 1.5 wt % to 5 wt %, or from 1.0 wt % to 3.0 wt % nucleator masterbatch, based on the total weight of the composition.

The nucleator may comprise one or more embodiments disclosed herein.

E. Additives

In an embodiment, the composition includes one or more additives. Representative additives include but are not limited to, processing aids, lubricants, stabilizers (antioxidants), foaming aids, surfactants, flow aids, viscosity control agents, coloring agents, copper inhibitors and the like. These additives can be added to the HDPE, LDPE, and/or peroxide-modified HDPE either before or during processing. The amount of any particular additive in the composition is typically from 0.01 to 1 wt %, more typically from 0.01 to 0.5 wt % and even more typically from 0.01 to 0.3 wt %, and the total amount of additives in the composition, if present at all, is typically from 0.01 to 5 wt %, more typically from 0.01 to 2 wt % and even more typically from 0.01 to 1 wt %, based on the total weight of the composition.

F. Foaming Agent

In an embodiment, the composition includes a foaming agent. The foaming agent is one or more suitable for the extrusion temperature, foaming conditions, foam forming method, and the like. When an insulating foam layer in the final form is to be formed simultaneously with extrusion forming, for example, an inert gas such as nitrogen, a carbon gas (e.g., CO, $CO_2$, etc.), helium, argon, and the like; hydrocarbon such as methane, propane, butane, pentane, and the like; halogenated hydrocarbons such as dichlorodifluoromethane, dichloromonofluoromethane, monochlorodifluoromethane, trichloromonofluoromethane, monochloropentafluoroethane, trichlorotrifluoroethane, and the like are used. The amount of the foaming agent to be used can vary. In an embodiment, the foaming agent is present in an amount of 0.001-0.1 part by weight, or 0.005-0.05 part by weight, per 100 parts by weight of the polymer composition (including the HDPE, LDPE, and peroxide-modified HDPE) to be foamed. The foaming agent may be mixed with an organic polymer to be foamed in advance or may be supplied into an extruder from a foaming agent supply opening formed on the barrel of the extruder.

G. Composition

The present disclosure provides a composition. In an embodiment, the composition is a foamable composition. The composition includes: (A) a high density polyethylene (HDPE); (B) a low density polyethylene (LDPE); (C) a peroxide-modified HDPE; (D) a nucleator; (E) optionally, an additive; and (F) optionally, a foaming agent.

In an embodiment, the composition, and further the foamable composition, includes:

(A) from 50 wt %, or 55 wt %, or 60 wt % to 69 wt %, or 70 wt %, or 75 wt %, or 80 wt %, or 85 wt %, or 90 wt %, or 95 wt % HDPE;

(B) from 5 wt %, or 10 wt %, or 15 wt %, or 20 wt %, or 25 wt %, or 28 wt % to 30 wt %, or 35 wt %, or 40 wt %, or 45 wt %, or 50 wt % LDPE;

(C) from 2 wt %, or 3 wt %, or 4 wt % to 5 wt %, or 6 wt %, or 7 wt %, or 8 wt %, or 9 wt %, or 10 wt % peroxide-modified HDPE (e.g., DTAP-modified HDPE);

(D) from 0.1 wt %, or 0.15 wt %, or 1.0 wt % to 1.5 wt %, or 2.0 wt %, or 3.0 wt %, or 4.0 wt %, or 5 wt % nucleator or nucleator masterbatch;

(E) from 0 wt %, or 0.01 wt %, or 0.05 wt % to 1 wt %, or 2 wt %, or 3 wt %, or 4 wt %, or 5 wt % of an additive; and (F) optionally, a foaming agent.

The nucleator may or may not be part of a masterbatch. In an embodiment, the peroxide-modified HDPE is formed from a composition containing from 99 wt %, or 99.2 wt % to 99.5 wt %, or 99.9 wt % HDPE and from 0.05 wt %, or 0.1 wt %, or 0.5 wt % to 0.8 wt %, or 1.0 wt % peroxide, based on the combined amount of HDPE and peroxide.

It is understood that the sum of the components in each of the compositions disclosed herein yields 100 weight percent (wt %).

The present composition includes at least four different components: (A) HDPE, (B) LDPE, (C) peroxide-modified HDPE, and (D) a nucleator. Thus, one component cannot serve as two components. For example, while the (C) peroxide-modified HDPE may be formed from the same HDPE as the (A) HDPE, the (C) peroxide-modified HDPE is different than the (A) HDPE because the (C) peroxide-modified HDPE has been melt blended with a peroxide and rheology-modified, while the (A) HDPE has not. The (A) HDPE is not rheology-modified with a peroxide and remains thermoplastic before and after it is included in the present composition. The (C) peroxide-modified HDPE may be formed from an HDPE that is the same or different than the (A) HDPE. In and embodiment, the (C) peroxide-modified HDPE is formed from an HDPE that is the same as the (A) HDPE.

In an embodiment, the composition excludes peroxide as a separate component. A composition that excludes peroxide as a separate component may or may not contain a residual amount of peroxide from the production of the (C) peroxide-modified HDPE. In an embodiment, the composition excludes peroxide (i.e., contains 0 wt % peroxide, based on the total weight of the composition).

In various embodiments, the composition is in the form of a pellet. When the composition is in the form of a pellet, the composition excludes the foaming agent. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the composition is in the form of a pellet with a diameter from 2.3 mm to 3.0 mm and a length from 2.3 mm to 3.0 mm.

In an embodiment, the composition has a dielectric constant (DC) (at 2.47 GHz) from 2.0, or 2.1, or 2.2 to 2.3, or 2.4.

In an embodiment, the composition has a dissipation factor (DF) (at 2.47 GHz) of less than 0.000200, or less than 0.000150, or less than 0.000110, or less than 0.000105, or less than 0.000100. In another embodiment, the composition has a dissipation factor (at 2.47 GHz) of from 0.0000500, or 0.0000800, or 0.0000850, or 0.0000900, or 0.0000950 to 0.0001000, or 0.000105, or 0.000110, or 0.000150, or 0.000200. In another embodiment, the composition has a dissipation factor (at 2.47 GHz) of from 0.0000500 to 0.000200, or from 0.0000500 to 0.000150, or from 0.0000800 to 0.000110.

In an embodiment, the composition has a melt strength greater than or equal to (>) 370 mN. In another embodiment, the composition has a melt strength of from 370 mN, or 380 mN, or 400 mN to 420 mN, or 430 mN, or 440 mN, or 450 mN, or 500 mN. In another embodiment, the composition has a melt strength of from 370 mN to 500 mN, or from 370 mN to 450 mN, or from 370 mN to 420 mN.

In an embodiment, the composition has one, some, or all of the following properties:

(i) a dielectric constant (DC) (at 2.47 GHz) from 2.0, or 2.1, or 2.2 to 2.3, or 2.4;

(ii) a dissipation factor (DF) (at 2.47 GHz) of from 0.0000500, or 0.0000800, or 0.0000850, or 0.0000900, or 0.0000950 to 0.0001000, or 0.000105, or 0.000110, or 0.000150, or 0.000200; and/or (iii) a melt strength of from 370 mN, or 380 mN, or 400 mN to 420 mN, or 430 mN, or 440 mN, or 450 mN, or 500 mN.

In an embodiment, the composition has at least two, or all of properties (i)-(iii).

The composition may comprise one or more embodiments disclosed herein.

H. Foaming Process

In an embodiment, the composition is foamed.

The composition may be foamed using known methods and known equipment. In an embodiment, a foam is produced by extruding the composition containing the HDPE, the LDPE, the peroxide-modified HDPE, and a nucleator using an extruder operated under foaming extrusion conditions, e.g., injection of a foaming agent while the composition is in a high pressure zone and then extruding the composition to a low pressure zone. Foaming process are further described by C. P. Park in *Polyolefin Foam*, Chapter 9, *Handbook of Polymer Foams and Technology*, edited by D. Klempner and K. C. Frisch, Hanser Publishers (1991).

In one embodiment, a typical extrusion foaming process uses a foaming agent such as an atmospheric gas (e.g., $CO_2$) to produce a foamed cable insulation as described in CA 2 523 861 C, Low Loss Foam Composition and Cable Having Low Loss Foam Layer. Dissolution of the foaming gas into the polymer melt is governed by Henry's law as reported for example in the work of H. Zhang (below) and others. Solubility is a function of the saturation pressure and the Henry's law constant, which itself is a function of temperature (Zhang Hongtao_201011_MASc_thesis.pdf; see also *Foam Extrusion: Principles and Practice* by Shau-Tarng Lee, editor). The MuCell® microcellular foam injection molding technology is an example of a commercially practiced foaming process, and it is described generally in U.S. Pat. No. 6,284,810.

Given the above on the importance of adequate pressure control during foaming extrusion, a suitable process would be the one commercially referred to as the MuCell® process, in which adequate pressures are built via specific hardware design, for effective nucleation as reported in U.S. Pat. No. 6,284,810. The method disclosed in this publication relies solely on high pressure drops (dP/dt) for self-nucleation of the foaming gas in the absence of an "auxiliary nucleating agent" (Col. 4, line 25-30).

In an embodiment, a foam is produced by extruding the composition containing the HDPE, the LDPE, the peroxide-modified HDPE, and a nucleator using an extruder operated under foaming extrusion conditions, e.g., injection of a carbon dioxide ($CO_2$) foaming agent while the composition is in a high pressure zone and then extruding the composition to a low pressure zone, wherein the $CO_2$ pressure ranges from 1 MPa to 5 MPa, or 12 MPa, or 40 MPa.

In an embodiment, the foam composition has a foam expansion of greater than 30%, or greater than 40%, or greater than 50%, or greater than 60%, or greater than 70%, or greater than 75%, or greater than 80%. In another embodiment, the foam composition has a foam expansion of from 30%, or 33%, or 40%, or 45%, or 46%, or 50%, or 55%, or 60%, or 65%, or 70%, or 75%, or 80% to 85%, or 90%, or 95%, or 100%. In an embodiment, the foam composition has a foam expansion of from 30% to 100%, or from 45% to 100%, or from 70% to 100%.

In an embodiment, the foam composition has an average cell size of less than 400 μm, or less than 390 μm, or less than 380 μm, or less than 375 μm, or less than 370 μm, or less than 360 μm, or less than 350 μm, or less than 340 μm, or less than 330 μm, or less than 320 μm, or less than 310 μm, or less than 300 μm, or less than 290 μm, or less than 280 μm, or less than 270 μm, or less than 260 μm, or less than 250 μm, or less than 240 μm, or less than 230 μm, or less than 220 μm. In another embodiment, the foam composition has an average cell size of from 100 μm, or 150 μm, or 200 μm to 220 μm, or 230 μm, or 240 μm, or 250 μm, or 260 μm, or 270 μm, or 280 μm, or 290 μm, or 300 μm, or 310 μm, or 320 μm, or 330 μm, or 340 μm, or 350 μm, or 360 μm, or 370 μm, or 375 μm, or 380 μm, or 390 μm, or 400 μm. In an embodiment, the foam composition has an average cell size of from 100 μm to 400 μm, or from 200 μm to 370 μm, or from 200 μm to 365 μm.

In various embodiments, the foam composition includes:

(A) from 50 wt %, or 55 wt %, or 60 wt % to 69 wt %, or 70 wt %, or 75 wt %, or 80 wt %, or 85 wt %, or 90 wt %, or 95 wt % HDPE;

(B) from 5 wt %, or 10 wt %, or 15 wt %, or 20 wt %, or 25 wt %, or 28 wt % to 30 wt %, or 35 wt %, or 40 wt %, or 45 wt %, or 50 wt % LDPE;

(C) from 2 wt %, or 3 wt %, or 4 wt % to 5 wt %, or 6 wt %, or 7 wt %, or 8 wt %, or 9 wt %, or 10 wt % peroxide-modified HDPE (e.g., DTAP-modified HDPE);

(D) from 0.1 wt %, or 0.15 wt %, or 1.0 wt % to 1.5 wt %, or 2.0 wt %, or 3.0 wt %, or 4.0 wt %, or 5 wt % nucleator or nucleator masterbatch;

(E) from 0 wt %, or 0.01 wt %, or 0.05 wt % to 1 wt %, or 2 wt %, or 3 wt %, or 4 wt %, or 5 wt % of an additive; and in one or more embodiments, the foam composition can have one, some, or all of the following properties:

(i) a foam expansion of from 30%, or 33%, or 40%, or 45%, or 46%, or 50%, or 55%, or 60%, or 65%, or 70%, or 75%, or 80% to 85%, or 90%, or 95%, or 100%;

(ii) an average cell size of from 100 μm, or 150 μm, or 200 μm to 220 μm, or 230 μm, or 240 μm, or 250 μm, or 260 μm, or 270 μm, or 280 μm, or 290 μm, or 300 μm, or 310 μm, or 320 μm, or 330 μm, or 340 μm, or 350 μm, or 360 μm, or 370 μm, or 375 μm, or 380 μm, or 390 μm, or 400 μm;

(iii) a dielectric constant (DC) (at 2.47 GHz) from 2.0, or 2.1, or 2.2 to 2.3, or 2.4, as measured on a solid plaque formed from a composition that is not foamed (i.e., on a solid plaque formed from the foam composition prior to foaming);

(iv) a dissipation factor (DF) (at 2.47 GHz) of from 0.0000500, or 0.0000800, or 0.0000850, or 0.0000900, or 0.0000950 to 0.0001000, or 0.000105, or 0.000110, or 0.000150, or 0.000200, as measured on a solid plaque formed from a composition that is not foamed; and/or (v) a melt strength of from 370 mN, or 380 mN, or 400 mN to 420 mN, or 430 mN, or 440 mN, or 450 mN, or 500 mN, as measured on a solid plaque formed from a composition that is not foamed.

In an embodiment, the peroxide-modified HDPE is formed from a composition containing from 99 wt %, or 99.2 wt % to 99.5 wt %, or 99.9 wt % HDPE and from 0.05 wt %, or 0.1 wt %, or 0.5 wt % to 0.8 wt %, or 1.0 wt % peroxide, based on the combined amount of HDPE and peroxide. In an embodiment, the foam composition excludes peroxide as a separate component.

In various embodiments, the foam composition has at least two, or at least three, or at least four, or all of properties (i)-(v).

Not wishing to be bound by any particular theory, Applicant believes the addition of the peroxide-modified HDPE to HDPE, LDPE, and a nucleator improves the foaming of the present composition to result in a foam composition with reduced cell size at equivalent expansion levels (i.e., foaming levels) compared to foam compositions containing HDPE, LDPE, a nucleator, and the same peroxide at the same amount (but without a peroxide-modified HDPE).

Not wishing to be bound by any particular theory, Applicant believes the present foam composition with a high melt strength (i.e., >370 mN) will have a high modulus and thus exhibit a high foam crush resistance, particularly compared to similar foam compositions made from LLDPE.

I. Process

The present disclosure also provides a process for making a foam composition. In an embodiment, the process includes the steps of:

(i) forming a composition comprising (A) HDPE, (B) LDPE, (C) a peroxide-modified HDPE, (D) a nucleator, and (E) optional additive; and (ii) contacting the composition with a foaming agent at a pressure from 1 MPa to 5 MPa, or 12 MPa, or 40 MPa under typical extrusion conditions.

The composition may be any composition disclosed herein. In an embodiment, the composition excludes peroxide as a separate component.

In an embodiment, the process includes the steps of:
(i) forming a composition comprising:
  (A) from 50 wt %, or 55 wt %, or 60 wt % to 69 wt %, or 70 wt %, or 75 wt %, or 80 wt %, or 85 wt %, or 90 wt %, or 95 wt % HDPE;
  (B) from 5 wt %, or 10 wt %, or 15 wt %, or 20 wt %, or 25 wt %, or 28 wt % to 30 wt %, or 35 wt %, or 40 wt %, or 45 wt %, or 50 wt % LDPE;
  (C) from 2 wt %, or 3 wt %, or 4 wt % to 5 wt %, or 6 wt %, or 7 wt %, or 8 wt %, or 9 wt %, or 10 wt % peroxide-modified HDPE (e.g., DTAP-modified HDPE);
  (D) from 0.1 wt %, or 0.15 wt %, or 1.0 wt % to 1.5 wt %, or 2.0 wt %, or 3.0 wt %, or 4.0 wt %, or 5 wt % nucleator or nucleator masterbatch;
  (E) from 0 wt %, or 0.01 wt %, or 0.05 wt % to 1 wt %, or 2 wt %, or 3 wt %, or 4 wt %, or 5 wt % of an additive; and
(ii) contacting the composition with a foaming agent that is $CO_2$ at a pressure from 1 MPa to 5 MPa, or 12 MPa, or 40 MPa under typical extrusion conditions.

In an embodiment, the composition is formed by feeding the HDPE, LDPE, peroxide-modified HDPE, nucleator, and optional additive simultaneously into a foaming extruder.

In an embodiment, the composition is formed by compounding the HDPE and the LDPE to produce an HDPE/LDPE blend, and feeding the HDPE/LDPE blend, the peroxide-modified HDPE, the nucleator, and the optional additive into a foaming extruder.

In an embodiment, the composition is formed by compounding the HDPE and the peroxide-modified HDPE to produce an HDPE/peroxide-modified HDPE blend, and feeding the HDPE/peroxide-modified HDPE blend, LDPE, the nucleator, and the optional additive into a foaming extruder.

In an embodiment, the composition is formed by compounding the nucleating agent with the LDPE to form a nucleated LDPE, and feeding the nucleated LDPE, the HDPE, the peroxide-modified HDPE, and the optional additive into a foaming extruder.

In an embodiment, the composition is formed by compounding the nucleating agent with the HDPE to form a nucleated HDPE, and feeding the nucleated HDPE, the LDPE, the peroxide-modified HDPE, and the optional additive into a foaming extruder.

In an embodiment, the composition is formed by compounding the nucleating agent with the peroxide-modified HDPE to form a nucleated peroxide-modified HDPE, and feeding the nucleated peroxide-modified HDPE, the LDPE, the HDPE, and the optional additive into a foaming extruder.

In an embodiment, the composition is formed by compounding the nucleating agent with the peroxide-modified HDPE and the HDPE to form a nucleated peroxide-modified HDPE/nucleated HDPE blend, and feeding the nucleated peroxide-modified HDPE/nucleated HDPE blend, the LDPE, and the optional additive into a foaming extruder.

In an embodiment, the process includes pelletizing the composition. In a further embodiment, the process includes feeding the pelletized composition into a foaming extruder.

In an embodiment, the process includes producing a foam composition. Typically, the composition is foamed as it exits an extrusion die, for the pressure drop results in foaming by the dissolved gas. In an embodiment, the process includes extruding the foam composition onto a conductor. The term "onto" includes direct contact or indirect contact between the foam composition and the conductor. In an embodiment, the process includes extruding the foam composition onto a conductor for form a sheath, such as an insulation layer. In an embodiment, the insulation layer has a thickness from 0.1 mm, or 0.2 mm to 0.3 mm, or 0.4 mm, or 0.8 mm, or 1.0 mm. In another embodiment, the insulation layer has a thickness from 0.1 mm to 2.0 mm, or 3.0 mm, or 4.0 mm, or 5.0 mm, or 10.0 mm. In an embodiment, the process includes simultaneously producing a foam composition and extruding the foam composition onto a conductor to form a coated conductor. Simultaneous formation of the foam composition and extrusion of onto a conductor advantageously allows for a production line speed of from 300 meters/min (m/min), or 500 m/min, or 1000 m/min, or 1500 m/min to 2000 m/min, or 2500 m/min. In an embodiment, the process includes forming a coated conductor at a line speed of greater than or equal to (>) 1500 m/min.

In various embodiments, the process for making a foam composition includes the steps of:
(i) forming a composition comprising:
  (A) from 50 wt %, or 55 wt %, or 60 wt % to 69 wt %, or 70 wt %, or 75 wt %, or 80 wt %, or 85 wt %, or 90 wt %, or 95 wt % HDPE;
  (B) from 5 wt %, or 10 wt %, or 15 wt %, or 20 wt %, or 25 wt %, or 28 wt % to 30 wt %, or 35 wt %, or 40 wt %, or 45 wt %, or 50 wt % LDPE;

(C) from 2 wt %, or 3 wt %, or 4 wt % to 5 wt %, or 6 wt %, or 7 wt %, or 8 wt %, or 9 wt %, or 10 wt % peroxide-modified HDPE (e.g., DTAP-modified HDPE);

(D) from 0.1 wt %, or 0.15 wt %, or 1.0 wt % to 1.5 wt %, or 2.0 wt %, or 3.0 wt %, or 4.0 wt %, or 5 wt % nucleator or nucleator masterbatch;

(E) from 0 wt %, or 0.01 wt %, or 0.05 wt % to 1 wt %, or 2 wt %, or 3 wt %, or 4 wt %, or 5 wt % of an additive;

(ii) pelletizing the composition;

(iii) feeding the pelletized composition into a foaming extruder;

(iv) contacting the pelletized composition or its melt with a foaming agent such as $CO_2$ at a pressure from 1 MPa to 5 MPa, or 12 MPa, or 40 MPa under typical extrusion conditions in the foaming extruder; and (v) optionally, extruding the foam composition onto a conductor for form a sheath, such as an insulation layer, having a thickness from 0.1 mm, or 0.2 mm to 0.3 mm, or 0.4 mm, or 0.8 mm, or 1.0 mm, or 2.0 mm, or 3.0 mm, or 4.0 mm, or 5.0 mm, or 10.0 mm.

in one or more embodiments, the insulation layer can have one, some, or all of the following properties:

(a) a foam expansion of from 30%, or 33%, or 40%, or 45%, or 46%, or 50%, or 55%, or 60%, or 65%, or 70%, or 75%, or 80% to 85%, or 90%, or 95%, or 100%;

(b) an average cell size of from 100 μm, or 150 μm, or 200 μm to 220 μm, or 230 μm, or 240 μm, or 250 μm, or 260 μm, or 270 μm, or 280 μm, or 290 μm, or 300 μm, or 310 μm, or 320 μm, or 330 μm, or 340 μm, or 350 μm, or 360 μm, or 370 μm, 375 μm, or 380 μm, or 390 μm, or 400 μm;

(c) a dielectric constant (DC) (at 2.47 GHz) from 2.0, or 2.1, or 2.2 to 2.3, or 2.4, as measured on a solid plaque formed from a composition that is not foamed;

(d) a dissipation factor (DF) (at 2.47 GHz) of from 0.0000500, or 0.0000800, or 0.0000850, or 0.0000900, or 0.0000950 to 0.0001000, or 0.000105, or 0.000110, or 0.000150, or 0.000200, as measured on a solid plaque formed from a composition that is not foamed; and/or (e) a melt strength of from 370 mN, or 380 mN, or 400 mN to 420 mN, or 430 mN, or 440 mN, or 450 mN, or 500 mN, as measured on a solid plaque formed from a composition that is not foamed.

In various embodiments, the insulation layer has at least two, or at least three, or at least four, or all of properties (a)-(e).

The present disclosure also provides a foam composition made by the process described above.

The present disclosure also provides a cable (e.g., a coaxial cable) having an insulation layer including a foam composition made by the process described above.

Compounding

Compounding of the blended compositions can be performed by standard means known to those skilled in the art. Examples of compounding equipment are internal batch mixers, such as a HAAK™, BANBURY™ or BOLLING™ internal mixers. Alternatively, continuous single or twin screw mixers can be used, such as a FARREL™ continuous mixer, a WERNER and PFLEIDERER™ twin screw mixer, or a BUSS™ kneading continuous extruder. The type of mixer utilized, and the operating conditions of the mixer, can affect properties of the composition such as viscosity, volume resistivity, and extruded surface smoothness.

The compounding temperature for the blends is typically from 170° C. to 200° C., and more typically from 180° C. to 190° C. The various components of the final composition can be added to and compounded with one another in any order, or simultaneously.

The process may comprise one or more embodiments disclosed herein.

J. Coated Conductor

The present disclosure also provides a coated conductor. The coated conductor includes a conductor and a coating on the conductor, the coating including the present foam composition. The foam composition may be any foam composition disclosed herein. In an embodiment, the foam composition excludes peroxide as a separate component.

In an embodiment, the coating is an insulation sheath for a conductor. The coating is located on the conductor. The coating may be one or more inner layers such as an insulating layer. The coating may wholly or partially cover or otherwise surround or encase the conductor. The coating may be the sole component surrounding the conductor. Alternatively, the coating may be one layer of a multilayer jacket or sheath encasing the conductor. In an embodiment, the coating directly contacts the conductor. In another embodiment, the coating directly contacts an insulation layer surrounding the conductor. In an embodiment, the coating has a thickness from 0.1 mm, or 0.2 mm to 0.3 mm, or 0.4 mm, or 0.8 mm, or 1.0 mm, or 2.0 mm, or 3.0 mm, or 4.0 mm, or 5.0 mm, or 10.0 mm. In an embodiment, the coated conductor is a cable such as a radio frequency cable (e.g., a coaxial cable). In another embodiment, the cable has a working frequency of greater than 2.47 GHz, or greater than 2.5 GHz, or greater than 20 GHz. In another embodiment, the cable has a working frequency of from 1 GHz, or 2 GHz, or 2.47 GHz, or 2.5 GHz, or 5 GHz, or 10 GHz, or 15 GHz, or 20 GHz to 30 GHz, or 40 GHz, or 50 GHz, or 60 GHz, or 70 GHz, or 80 GHz, or 90 GHz, or 100 GHz, or 200 GHz, or 300 GHz, or 500 GHz, or 1000 GHz, or 2000 GHz, or 3000 GHz.

In various embodiments, the coated conductor (such as a coaxial cable) includes:

(i) a conductor; and (ii) a coating on the conductor, the coating including a foam composition formed from a composition comprising:

(A) from 50 wt %, or 55 wt %, or 60 wt % to 69 wt %, or 70 wt %, or 75 wt %, or 80 wt %, or 85 wt %, or 90 wt %, or 95 wt % HDPE;

(B) from 5 wt %, or 10 wt %, or 15 wt %, or 20 wt %, or 25 wt %, or 28 wt % to 30 wt %, or 35 wt %, or 40 wt %, or 45 wt %, or 50 wt % LDPE;

(C) from 2 wt %, or 3 wt %, or 4 wt % to 5 wt %, or 6 wt %, or 7 wt %, or 8 wt %, or 9 wt %, or 10 wt % peroxide-modified HDPE (e.g., DTAP-modified HDPE);

(D) from 0.1 wt %, or 0.15 wt %, or 1.0 wt % to 1.5 wt %, or 2.0 wt %, or 3.0 wt %, or 4.0 wt %, or 5 wt % nucleator or nucleator masterbatch;

(E) optionally, from 0 wt %, or 0.01 wt %, or 0.05 wt % to 1 wt %, or 2 wt %, or 3 wt %, or 4 wt %, or 5 wt % of an additive; and (F) optionally, a foaming agent; and in one or more embodiments, the coating (such as an insulation layer) can have one, some, or all of the following properties:

(a) a foam expansion of from 30%, or 33%, or 40%, or 45%, or 46%, or 50%, or 55%, or 60%, or 65%, or 70%, or 75%, or 80% to 85%, or 90%, or 95%, or 100%;

(b) an average cell size of from 100 μm, or 150 μm, or 200 μm to 220 μm, or 230 μm, or 240 μm, or 250 μm, or 260 μm, or 270 μm, or 280 μm, or 290 μm, or 300 μm, or 310 μm, or 320 μm, or 330 μm, or 340 μm, or 350 μm, or 360 μm, or 370 μm, or 375 m or 380 m, or 390 m, or 400 μm;

(e) a dielectric constant (DC) (at 2.47 GHz) from 2.0, or 2.1, or 2.2 to 2.3, or 2.4, as measured on a solid plaque formed from a composition that is not foamed;

(d) a dissipation factor (DF) (at 2.47 GHz) of from 0.0000500, or 0.0000800, or 0.0000850, or 0.0000900, or 0.0000950 to 0.0001000, or 0.000105, or 0.000110, or 0.000150, or 0.000200, as measured on a solid plaque formed from a composition that is not foamed;

(e) a melt strength of from 370 mN, or 380 mN, or 400 mN to 420 mN, or 430 mN, or 440 mN, or 450 mN, or 500 mN, as measured on a solid plaque formed from a composition that is not foamed; and/or (f) a thickness from 0.1 mm, or 0.2 mm to 0.3 mm, or 0.4 mm, or 0.8 mm, or 1.0 mm, or 2.0 mm, or 3.0 mm, or 4.0 mm, or 5.0 mm, or 10.0 mm; and in one or more embodiments, the coated conductor is a cable having a working frequency of from 1 GHz, or 2 GHz, or 2.47 GHz, or 2.5 GHz, or 5 GHz, or 10 GHz, or 15 GHz, or 20 GHz to 30 GHz, or 40 GHz, or 50 GHz, or 60 GHz, or 70 GHz, or 80 GHz, or 90 GHz, or 100 GHz, or 200 GHz, or 300 GHz, or 500 GHz, or 1000 GHz, or 2000 GHz, or 3000 GHz.

In various embodiments, the coating has at least two, or at least three, or at least four, or all of properties (a)-(f).

The coated conductor may comprise one or more embodiments disclosed herein.

By way of example, and not limitation, examples of the present disclosure are provided.

EXAMPLES

1. Test Methods

LDPE, HDPE, and nucleator density is measured in accordance with ASTM D792, Method B. The result is recorded in grams (g) per cubic centimeter (g/cc or g/cm$^3$).

Foam density is measured in accordance with ASTM D792-00 involving weighing polymer foam in water using a sinker. The result is recorded in g/cc.

Melt index (MI) is measured in accordance with ASTM D1238, Condition 190° C./2.16 kilogram (kg) weight, also known as $I_2$. The result is reported g/10 min.

Dissipation Factor (DF) and Dielectric Constant (DC) are measured in accordance with ASTM D150. DF and DC testing is conducted on a High Frequency Split Post Dielectric Resonator at a frequency of 2.47 GHz on 50 mil (1.3 mm) compression molded plates. Before measurements, the plates are conditioned for 24 hours at room temperature to room temperature (21-24° C.) in a desiccant chamber.

Melt Strength

Melt strength measurements are conducted on a Gottfert Rheotens 71.97 (Goettfert Inc.; Rock Hill, S.C.) attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.200 mm/second. The standard test temperature is 190° C. The sample is drawn uniaxially to a set of accelerating nips located 100 mm below the die with an acceleration of 6.0 mm/sec$^2$. The tensile force is recorded as a function of the take-up speed of the nip rolls. Melt strength is reported as the plateau force (mN) before the strand breaks. The following conditions are used in the melt strength measurements: plunger speed=0.200 mm/sec; start speed=30 mm/s; wheel acceleration=6.0 mm/sec$^2$; capillary diameter=2.0 mm; capillary length=30 mm; barrel diameter=12 mm; and the gap of the wheel=0.3 mm.

Foam Expansion

Foam density is measured in accordance with ASTM D792-00 involving weighing polymer foam in water using a sinker. The density is measured three times and averaged ($D_{ave}$). The expansion ratio of a foam composition is calculated according to the following equation:

$$\text{Expansion } (\%) = \frac{(D_{PE} - D_{ave})}{D_{PE}}$$

$D_{PE}$ is the density of a solid formulated polyethylene resin (i.e., not foamed). $D_{PE}$ is about 0.952 g/cc.

2. Materials

The materials used in the examples are provided in Table 1 below.

TABLE 1

| Material | Description/Properties | | Source |
| --- | --- | --- | --- |
| DGDA-6944 NT | HDPE density = 0.965 g/cc | MI = 8 g/10 min (190° C./2.16 kg) | The Dow Chemical Company |
| DFDB-1258 NT | LDPE density = 0.922 g/cc | MI = 6.0 g/10 min (190° C./2.16 kg) | The Dow Chemical Company |
| MB-1 | masterbatch containing 10 wt % PTFE nucleator and ethene homopolymer* density = 0.97 g/cc | MI = 2.0 g/10 min (190° C./5.00 kg) | The Dow Chemical Company |
| DTAP | di-t-amyl peroxide | CAS No. 10508-09-5 | Tianjin McRIT Co. Ltd. |
| $CO_2$ | carbon dioxide | purity: 99.9% | Air Product Co. Ltd. |

*Based on the total weight of the nucleator masterbatch

Cell size is measured by fracturing foam compositions utilizing liquid nitrogen and then coating the fractured foam compositions with Iridium. Scanning Electron Microscopy (SEM) Images are obtained with different magnification. The average cell size is obtained through analysis of the SEM photographs by the software of Image-Pro Plus 6.0 from Media Cybernetics.

3. Protocols a. Preparation of the Peroxide-Modified HDPE

HDPE (DGDA-6944 NT) (3.98 kg) and DTAP (20 grams) (i.e., 0.5 wt % DTAP peroxide) are fed into a Leistritz co-rotating intermeshing twin-screw extruder. The DTAP may be (i) dry-blended with HDPE pellets prior to feeding into the extruder; (ii) soaked into the HDPE pellets prior to feeding into the extruder, (iii) dry-blended with HDPE powder formed by grinding HDPE pellets into a powder; or (iv) injected directly into the extruder downstream of the HDPE feed.

Figure 2:
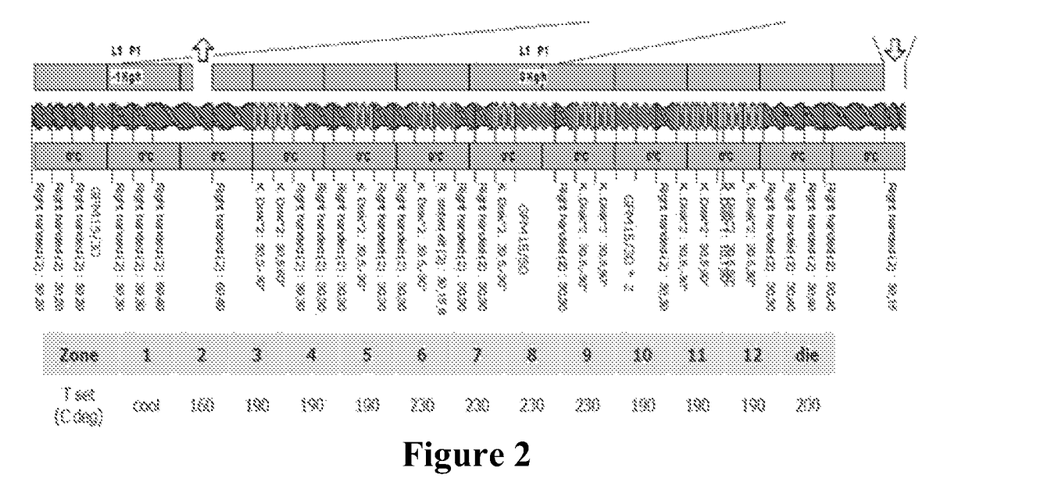
FIG. 2 is a schematic of the reactive extrusion process used in the examples.

The key parameters of the extruder are as follows: extruder diameter (D)=27 mm; length to diameter ratio (L/D)=40/1; screw flight depth=4.5 mm; and maximum shaft torque=106 N·m. The screw configuration of the extruder is depicted in FIG. 2. The reactive extrusion process temperature profile is cooled/80/140/160/190/190/190/190/190/190/190/200/200. The extruder rotation speed is 250 rotations per minute (RPM) and output is 20 kg/hr. In order to minimize the concentration of the volatile components in the polymer melt, a vacuum system is used to remove the residue volatile component from the melt at barrel zone 11 in the process. An underwater pelletizer with a 4-hole die is used to pelletize the DTAP-modified HDPE. 4.0 kg of DTAP-modified HDPE pellets are formed.

i. Rheology Modification Testing

Two additional DTAP-modified HDPE resins are prepared using the above-described process, except they are formed from a blend with 0.7 wt % DTAP and 1 wt % DTAP, respectively (compared to the above-described DTAP-modified HDPE formed from a blend with 0.5 wt % DTAP). Gel analysis is performed on the three DTAP-modified HDPE resins via xylene extraction for 4 days. The results are shown in Table 1A. The results demonstrate that the HDPE is rheology-modified to form the DTAP-modified HDPE.

TABLE 1A

| DTAP-modified HDPE | Gel Content |
|---|---|
| DTAP-modified HDPE formed from blend with 0.5 wt % DTAP | 0 wt % |
| DTAP-modified HDPE formed from blend with 0.7 wt % DTAP | 3 wt % |
| DTAP-modified HDPE formed from blend with 1.0 wt % DTAP | 21 wt % | b. Preparation of Examples

The DTAP-modified HDPE pellets (formed from a blend with 0.5 wt % DTAP), HDPE (DGDA-6944 NT), LDPE (DFDB-1258 NT), and nucleating agent masterbatch (MB-1) are dry-blended and then fed into a physical foaming extruder. A foam composition is formed upon exit of the extruder die. Table 2 shows the amount, in weight percent (wt %), of each component included in the example compositions.

Figure 1:
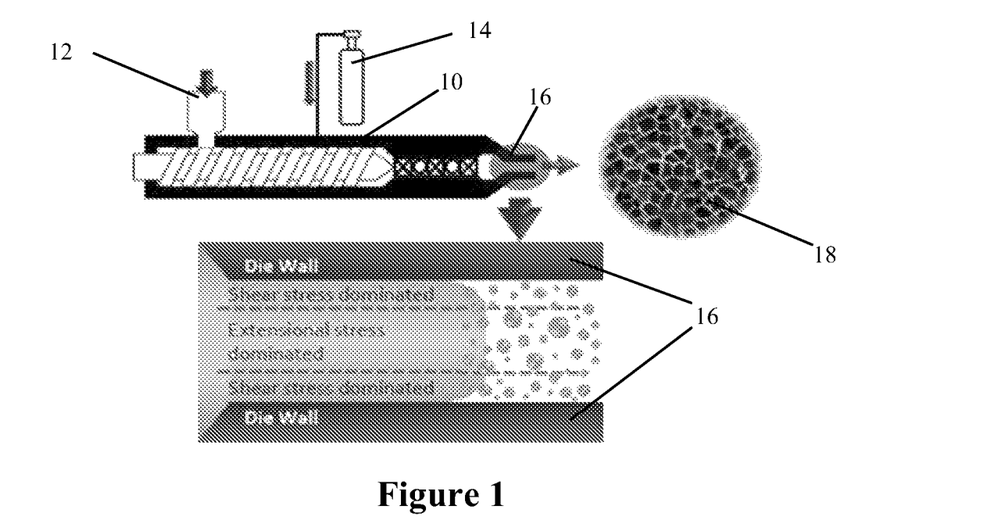
FIG. 1 is a schematic of the foaming extruder used in the examples.

FIG. 1 provides a general description of the foaming extruder. As shown, the peroxide-modified HDPE, HDPE, LDPE, nucleating agent masterbatch, and optional additive are fed (12) into the foaming extruder (10). The extrusion foaming extruder is a single-screw extruder (D=50 mm; L/D=45; maximum output 10 kg/hr) equipped with a $CO_2$ gas injection system (14) that is equipped with a gear wheel pump for IE-1, IE-2, IE-3 and IE-4, and a ram-type pump for IE-5, IE-6, IE-7, IE-8, IE-9 and IE-10. $CO_2$ is injected into the extruder in the middle section along the extruder. The $CO_2$ foaming agent is at a pressure of 5 MPa in the extruder, and the flow rate of the liquid $CO_2$ is 1.0 ml/min. The maximum gas injection pressure is 12 MPa, and the flow rate of the liquid $CO_2$ may be adjusted in the range of 0-20 ml/min. A static mixer is placed toward the end of the extruder to achieve a homogenous temperature and melt flow field. A strand die with an L/D ratio of 6 mm/2 mm is installed at the end of the extruder. The extrusion conditions use the following profile: 140° C./170° C. (gas injection)/180° C./170° C./147° C. (static mixer), and a 25 RPM screw speed. The peroxide-modified HDPE, HDPE, LDPE, nucleating agent masterbatch, and optional additive contact the foaming agent within the foaming extruder (10) and exit through the extruder die (16) and form a foam composition (18).

c. Preparation of Comparative Samples

The components are fed into a physical foaming extruder, contacted with the $CO_2$ foaming agent, and extruded. The extrusion foaming extruder is a single-screw extruder (D=50 mm; L/D=45; maximum output 10 kg/hr) equipped with a $CO_2$ gas injection system that is equipped with a gear wheel pump for CS-0, and a ram-type pump for CS-1, CS-2, CS-3 and CS-4. $CO_2$ is injected into the extruder in the middle section along the extruder. The $CO_2$ foaming agent is at a pressure of 5 MPa in the extruder, and the flow rate of the liquid $CO_2$ is 1.0 ml/min. The maximum gas injection pressure is 12 MPa, and the flow rate of the liquid $CO_2$ may be adjusted in the range of 0-20 ml/min. A static mixer is placed toward the end of the extruder to achieve a homogenous temperature and melt flow field. A strand die with an L/D ratio of 6 mm/2 mm is installed at the end of the extruder. The extrusion conditions use the following profile: 140° C./170° C. (gas injection)/180° C./170° C./147° C. (static mixer), and a 25 RPM screw speed. A foam composition is formed upon exit of the extruder die. Table 2 shows the amount, in weight percent, of each component included in the comparative sample compositions.

Comparative Samples CS-0 and CS-4 are control samples. CS-0 is produced using a gas injection system equipped with a gear wheel pump. CS-4 is produced using a gas injection system equipped with a ram-type pump (piston). The gas injection variance between the gear wheel pump (CS-0) and the ram-type pump (CS-4) is calibrated and compared. The ram-type pump (CS-4) injects slightly more $CO_2$ liquid than the gear wheel pump (CS-0) under the same injection flow rate (i.e., 1 ml/min). This difference is reflected in the variance in foam expansion and cell size between CS-0 and CS-4, but similar electrical properties, as shown in Table 2.

d. Preparation of Polyethylene Plates

The example compositions and comparative sample compositions are each pelletized. The pellets are placed in a mold in a hot plate compression molding machine, e.g., Platent Vulcanizing Press, manufactured by Guangzhou NO. 1 Rubber & Plastic Equipment Co., Ltd., preheated to 170° C., held for 5 minutes and then subjected to compression pressure for 10 minutes. The resulting plate is cooled to room temperature (21-24° C.) and stored for electric property testing. The reported dissipation factor (DF) and dielectric constant (DC) values are the average of three measurements performed on solid (i.e., non-foamed) plaques made from the compositions. The results are shown in Table 2.

e. Cell Size Analysis

The foam example compositions and comparative sample compositions are fractured utilizing liquid nitrogen and then coated with Iridium. Scanning Electron Microscopy (SEM) Images (FIG. 3) are obtained with different magnification. The average cell size is obtained through analysis of the SEM photographs by the software of Image-Pro Plus 6.0 from Media Cybernetics. The results are shown in Table 2.

f. Foam Expansion

Foam density is measured in accordance with ASTM D792-00 involving weighing polymer foam in water using a sinker. The reported density is the average of three measurements ($D_{ave}$). The expansion ratio of the foam composition is calculated. The results are shown in Table 2.

g. Results

Table 2 shows the amount, in weight percent, of each component included in the example compositions, and the measured properties of each composition HDPE and do not contain peroxide as a separate component). Furthermore, the present foam compositions containing HDPE, LDPE, peroxide-modified HDPE, and a nucleator (which have been foamed with a $CO_2$ foaming agent) (IE-1 to IE-10) advantageously exhibit a lower dissipation factor than comparative foam compositions in which the peroxide is directly added to the extruder as a separate component (rather than being melt blended with a portion of the HDPE to form a peroxide-modified HDPE prior to being added to the extruder) (CS-1 and CS-2).

Figure 3:
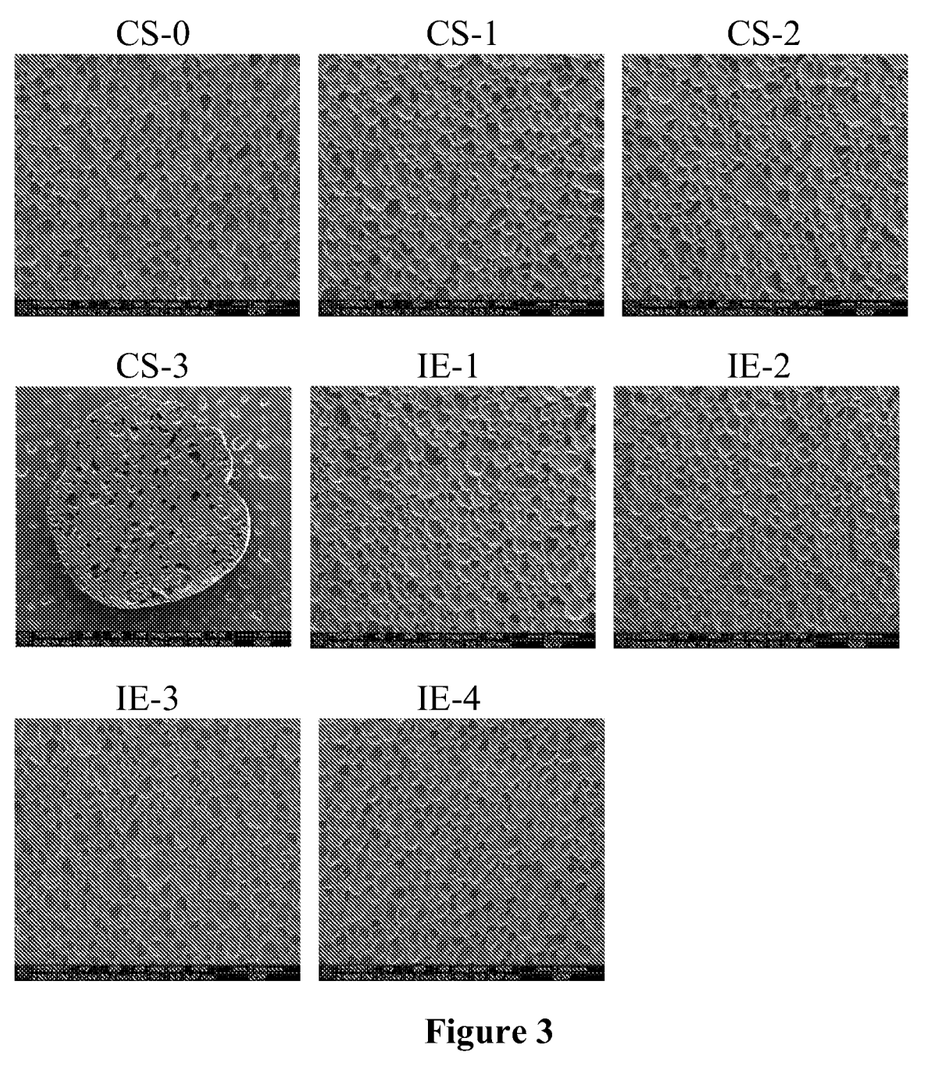
FIG. 3 is a set of scanning electron microscopy (SEM) images used to calculate the cell sizes of certain of the foams reported in the examples.

The SEM images as shown in FIG. 3 (and the average cell size values provided in Table 2) demonstrate that the present foam compositions containing HDPE, LDPE, peroxide-modified HDPE, and a nucleator (IE-1 to IE-4) exhibit a smaller cell size than both (i) the control sample which lacks a peroxide-modified HDPE and does not contain peroxide as

TABLE 2

|  | IE-1 | IE-2 | IE-3 | IE-4 | IE-5 | IE-6 | IE-7 | IE-8 |
|---|---|---|---|---|---|---|---|---|
| HDPE | 68.00 | 66.00 | 64.00 | 60.00 | 65.00 | 68.50 | 73.50 | 78.50 |
| LDPE | 28.50 | 25.80 | 28.50 | 28.50 | 28.50 | 25.00 | 20.00 | 15.00 |
| DTAP-Modified HDPE | 2.00 | 4.00 | 6.00 | 10.00 | 5.00 | 5.00 | 5.00 | 5.00 |
| DTAP | — | — | — | — | — | — | — | — |
| Nucleator Masterbatch MB-1 | 1.50 | 1.50 | 1.50 | 1.50 | 1.50 | 1.50 | 1.50 | 1.50 |
| Total (wt %) | 100 | 100 | 100 | 100 | 100 | 100 | 100 | 100 |
| Total DTAP wt %[1] | 0.01 | 0.02 | 0.03 | 0.05 | 0.025 | 0.025 | 0.025 | 0.025 |
| HDPE/LDPE ratio | 70/30 | 70/30 | 70/30 | 70/30 | 70/30 | 75/25 | 80/20 | 85/15 |
| Melt Strength (mN) | 380 | 370 | 400 | 420 |  |  |  |  |
| Foam Density (g/cc)[2] | 0.18 | 0.18 | 0.20 | 0.27 | 0.20 | 0.19 | 0.21 | 0.28 |
| Foam Expansion (%) | 81 | 81 | 79 | 72 | 79 | 80 | 78 | 70 |
| Average Cell Size (μm) | 265 | 238 | 255 | 275 | 278 | 375 | 328 | 363 |
| Average DC (2.47 GHz) | 2.30 | 2.30 | 2.28 | 2.29 | 2.311 | 2.321 | 2.328 | 2.332 |
| Average DF (2.47 GHz) | 1.05E−04 | 1.05E−04 | 1.05E−04 | 1.10E−04 | 1.00E−04 | 1.00E−04 | 9.00E−05 | 9.00E−05 |

|  | IE-9 | IE-10 | CS-0 | CS-1 | CS-2 | CS-3 | CS-4 |
|---|---|---|---|---|---|---|---|
| HDPE | 83.50 | 88.50 | 68.95 | 68.94 | 68.93 | 92.50 | 68.95 |
| LDPE | 10.00 | 5.00 | 29.55 | 29.54 | 29.54 | — | 29.55 |
| DTAP-Modified HDPE | 5.00 | 5.00 | — | — | — | 6.00 | — |
| DTAP | — | — | — | 0.02 | 0.03 | — | — |
| Nucleator Masterbatch MB-1 | 1.50 | 1.50 | 1.50 | 1.50 | 1.50 | 1.50 | 1.50 |
| Total (wt %) | 100 | 100 | 100 | 100 | 100 | 100 | 100 |
| Total DTAP wt %[1] | 0.025 | 0.025 | 0 | 0.02 | 0.03 | 0.03 | 0 |
| HDPE/LDPE ratio | 90/10 | 95/5 | 70/30 | 70/30 | 70/30 | 70/30 | 70/30 |
| Melt Strength (mN) |  |  | 370 | 430 | 450 |  |  |
| Foam Density (g/cc)[2] | 0.51 | 0.64 | 0.18 | 0.19 | 0.19 | 0.69 | 0.17 |
| Foam Expansion (%) | 46 | 33 | 81 | 80 | 80 | 27 | 82 |
| Average Cell Size (μm) | 303 | 216 | 332 | 309 | 314 | 197 | 378 |
| Average DC (2.47 GHz) | 2.323 | 2.324 | 2.30 | 2.31 | 2.29 |  | 2.309 |
| Average DF (2.47 GHz) | 8.50E−05 | 8.00E−05 | 1.00E−04 | 1.20E−04 | 1.20E−04 |  | 1.00E−04 |

IE = Inventive Example;
CS = Comparative Sample
[1]Total DTAP loading in the entire composition, including the DTAP-modified HDPE, based on the total weight of the composition.
[2]Foam density is reported as the average of three measurements ($D_{ave}$).

The present foam compositions containing HDPE, LDPE, peroxide-modified HDPE, and a nucleator (IE-1 to IE-10) maintain a low dissipation factor (DF) (i.e., <0.000110) that is comparable to the dissipation factor exhibited by control samples CS-0 and CS-4 (which lack a peroxide-modified HDPE and do not contain peroxide as a separate component (CS-0) and (ii) the comparative samples in which the peroxide is directly added to the extruder as a separate component (rather than being melt blended with a portion of the HDPE to form a peroxide-modified HDPE prior to being added to the extruder) (CS-1 and CS-2). While a comparative sample containing HDPE, peroxide-modified HDPE, and a nucleator (but no LDPE) exhibits a small cell size, it has a foam expansion of less than 30%. In contrast, the present foam compositions advantageously have a foam expansion of greater than 30% and exhibit a small cell size (i.e., <375 μm), while also exhibiting a low dissipation factor (DF) (i.e., <0.000110), indicating IE-1 to IE-10 are suitable for making coated conductors such as coaxial cables.

It is specifically intended that the present invention not be limited to the embodiments and illustrations contained herein, but include modified forms of those embodiments including portions of the embodiments and combinations of elements of different embodiments as come within the scope of the following claims.

We claim:

1. A foamable composition comprising:
   (A) a high density polyethylene (HDPE);
   (B) a low density polyethylene (LDPE);
   (C) a peroxide-modified HDPE having a gel content of 0 wt %;
   (D) a nucleator;
   (E) optionally, an additive; and
   (F) optionally, a foaming agent.

2. The foamable composition of claim 1 comprising:
   (A) from 60 wt % to 90 wt % HDPE;
   (B) from 5 wt % to 30 wt % of LDPE;
   (C) from 2 wt % to 10 wt % peroxide-modified HDPE having a gel content of 0 wt %;
   (D) from 1.0 wt % to 2.0 wt % nucleator; and
   (F) the foaming agent.

3. A foam formed from the foamable composition of claim 1.

4. A process for making a foam composition, the process comprising the steps of:
   (i) forming a composition comprising:
      (A) a high density polyethylene (HDPE);
      (B) a low density polyethylene (LDPE);
      (C) a peroxide-modified HDPE having a gel content of 0 wt %,
      (D) a nucleator; and
      (E) optional additive; and
   (ii) contacting the composition with a foaming agent at a pressure from 1 MPa to 40 MPa under extrusion conditions.

5. The process of claim 4 wherein the composition comprises:
   (A) from 60 wt % to 90 wt % HDPE;
   (B) from 5 wt % to 30 wt % of LDPE;
   (C) from 2 wt % to 10 wt % peroxide-modified HDPE having a gel content of 0 wt %;
   (D) from 1.0 wt % to 2.0 wt % nucleator; and
   the process comprises forming a foam having
   (i) a foam expansion from 30% to 85%, or
   (ii) an average cell size from 200 μm to 370 μm, or
   (iii) a dielectric constant from 2.2 to 2.4, or
   (iv) a dissipation factor (at 2.47 GHz) from 0.0000500 to 0.000150, or
   (v) a melt strength from 370 mN to 420 mN.

6. The process of claim 4 in which the peroxide-modified HDPE is a di-t-amyl peroxide-modified HDPE.

7. A foam made by the process of claim 4.

8. The foam of claim 7, wherein the foam has a dissipation factor (DF) (at 2.47 GHz) of from 0.0000500 to 0.000110, as measured on a solid plaque formed from the foam.

9. The foam of claim 7, wherein the foam has a foam expansion of from 30% to 100% and an average cell size of from 100 μm to 375 μm.

10. A cable comprising an insulation layer comprising the foam of claim 7.

11. The foamable composition of claim 2 wherein the foamable composition has from 0.01 wt % to 0.05 wt % peroxide based on the total weight of the foamable composition.

12. The foamable composition of claim 11 wherein the nucleator is a fluororesin.

13. The process of claim 5 wherein the nucleator is a fluororesin.

14. The process of claim 13 comprising
forming a foam having
   (i) a foam expansion from 30% to 85%, and
   (ii) an average cell size from 200 μm to 370 μm, and
   (iii) a dielectric constant from 2.2 to 2.4, and
   (iv) a dissipation factor (at 2.47 GHz) from 0.0000500 to 0.000150, and
   (v) a melt strength from 370 mN to 420 mN.

* * * * *